United States Patent [19]

Sharma et al.

[11] Patent Number: 5,464,883

[45] Date of Patent: Nov. 7, 1995

[54] WATERBORNE CORRECTION FLUID FOR CORRECTING LASER-JET AND PHOTOCOPIED MARKINGS

[75] Inventors: Mahendra K. Sharma; Andy H. Singleton; John J. Hiller, all of Kingsport, Tenn.

[73] Assignee: Eastman Chemical Company, Kingsport, Tenn.

[21] Appl. No.: 254,084

[22] Filed: Jun. 3, 1994

[51] Int. Cl.$^6$ ................. C09D 10/00; C08K 3/22
[52] U.S. Cl. ............... 523/161; 524/431; 106/20 A; 106/19 A
[58] Field of Search .............. 523/161; 106/19 R, 106/19 A, 20 A; 524/431, 513, 379, 386

[56] References Cited

U.S. PATENT DOCUMENTS

| | | | |
|---|---|---|---|
| 5,075,364 | 12/1991 | Phan et al. | 524/513 |
| 5,129,947 | 7/1992 | Sharma et al. | 106/20 R |
| 5,199,976 | 4/1993 | Yau et al. | 106/19 |
| 5,218,032 | 6/1993 | Sharma | 524/513 |
| 5,274,025 | 12/1993 | Stockl et al. | 524/513 |
| 5,294,650 | 3/1994 | Sharma | 523/523 |

FOREIGN PATENT DOCUMENTS

| | | |
|---|---|---|
| 2058110A | 4/1981 | United Kingdom . |
| WO93/21261 | 10/1993 | WIPO . |

*Primary Examiner*—Tae H. Yoon
*Attorney, Agent, or Firm*—John D. Thallemer; John F. Stevens

[57] ABSTRACT

The present invention relates to a high solids content waterborne correction fluid that dries quickly and bonds to paper surfaces for correcting laser-jet printed and photocopied markings. More specifically, the waterborne correction fluid contains a water-dispersible sulfopolyester, an opacifying pigment, and water.

2 Claims, No Drawings

WATERBORNE CORRECTION FLUID FOR CORRECTING LASER-JET AND PHOTOCOPIED MARKINGS

FIELD OF THE INVENTION

The present invention relates to a high solids content waterborne correction fluid that dries quickly and bonds to paper surfaces for correcting laser-jet printed and photocopied markings. More specifically, the waterborne correction fluid contains a water-dispersible sulfopolyester, an opacifying pigment, and water.

BACKGROUND OF THE INVENTION

Correction fluids are used for correcting handwritten, typewritten or photocopied markings on paper. Generally correction fluids are applied to a paper surface in liquid form. After application, correction fluids should dry relatively quickly to provide a film which can effectively cover erroneous markings on the surface and can receive a corrected marking. It is required that the dried film be strongly bonded to the paper surface, and sufficiently flexible that the film will not be removed under normal conditions. It is also desired that the composition dry at a rapid rate. Other desired performance characteristics include good storage stability, and flow and viscosity characteristics which permit easy and even application of the fluid.

Correction fluids typically contain an acrylic binding resin, and an opacifying pigment, usually titanium dioxide, dispersed in a solvent. Halogenated hydrocarbon solvents have been the solvents of choice because of their evaporation rates which provide correction fluids which dry rapidly and completely. Additionally, they do not interact with typewritten markings to cause unacceptable bleeding. Also, they can effectively dissolve those film forming polymeric materials which provide durable but flexible films without causing excessive cockling or distortion of paper surfaces. Despite their recognized advantages when used as correction fluid solvents, the use of halogenated hydrocarbon solvents has become a matter of increased concern primarily because of their adverse effect on the environment (stratospheric ozone depletion) and also because of their potential adverse effect on health through solvent abuse. Accordingly, the elimination of halogenated hydrocarbon solvents from correction fluids is desired.

Non-halogenated hydrocarbon-free correction fluids are disclosed in U.S. Pat. No. 5,199,976 and PCT App. WO 93/21261. U.S. Pat. No. 5,199,976 discloses a correction fluid containing a volatile, nonhalogenated solvent, a vinyl toluene-butadiene copolymer as the polymeric-film forming material, a dispersing agent and an opacifying agent. While halogens have been removed from the correction fluid, the volatile solvents cause health and environmental problems.

PCT App. WO 93/21261 discloses a correction fluid containing a volatile, nonhalogenated solvent, an isobutyl methacrylate copolymer as the polymeric-film forming material, a plasticizer, and an opacifying agent. While halogens have been removed from the correction fluid, the volatile solvents cause health and environmental problems. Accordingly, the elimination of volatile organic solvents (VOC's) from correction fluids is desired.

UK Pat. App. GB 2 058 110 A discloses an aqueous correction fluid containing a stable emulsion of a water-dispersed, water-insoluble acrylic resin as a binder for the masking pigment. The correction fluid forms smooth, highly opaque, and flexible masking coatings. However, the correction fluid has an unacceptable drying time due to the large amount of water.

SUMMARY OF THE INVENTION

Accordingly, it is one object of the present invention to provide a waterborne correction fluid.

Accordingly, it is another object of the invention to provide a waterborne correction fluid with less than 10% volatile organic compounds.

Still another object of the invention is to provide a waterborne correction fluid which dries quickly and bonds to paper surfaces to correct laser-jet printed and photocopied markings.

These and other objects are accomplished herein by a high solids content waterborne correction fluid for correcting laser-jet printed and photocopied markings comprising:

(A) 5 to 25 weight percent of a sulfopolyester having a weight average molecular weight of 5,000 to 30,000, an inherent viscosity of 0.1 to 1.0 dl/g, and a glass transition temperature of 27° C. to 120° C., comprising repeat units from
   (1) a dicarboxylic acid selected from the group consisting of aromatic dicarboxylic acids, saturated aliphatic dicarboxylic acids, cycloaliphatic dicarboxylic acids, and combinations thereof;
   (2) a diol; and
   (3) a difunctional sulfomonomer containing at least one sulfonate group attached to an aromatic nucleus wherein the functional groups are hydroxy, carboxy or amino, provided the difunctional sulfomonomer is present in an amount from 4 to 25 mole percent based on 100 mole percent dicarboxylic acid and 100 mole percent diol;

(B) 20 to 60 weight percent an opacifying pigment; and (C) 20 to 45 weight percent of water, wherein the correction fluid has a solids content of 50 to 80 percent.

DESCRIPTION OF THE INVENTION

The waterborne correction fluid of the present invention contains a water-dispersible sulfopolyester, an opacifying pigment, and water. By "waterborne" it is meant that the correction fluid is water based, and contains less than 20% of volatile organic solvents.

The sulfopolyester, component (A), has a weight average molecular weight of 5,000 to 30,000, preferably 7,000 to 15,000 and more preferably 10,000 to 12,000. The sulfopolyester has a glass transition temperature of 27° C. to 120° C. and contains repeat units from a dicarboxylic acid, a diol and a difunctional sulfomonomer. Preferably, the glass transition temperature is 35° C. to 60° C. More preferably, the glass transition temperature is 45° C. to 55° C.

Dicarboxylic acids useful in the present invention include aromatic dicarboxylic acids preferably having 8 to 14 carbon atoms, saturated aliphatic dicarboxylic acids preferably having 4 to 12 carbon atoms, and cycloaliphatic dicarboxylic acids preferably having 8 to 12 carbon atoms. Specific examples of dicarboxylic acids are: terephthalic acid, phthalic acid, isophthalic acid, naphthalene-2,6-dicarboxylic acid, cyclohexanedicarboxylic acid, cyclohexanediacetic acid, diphenyl-4,4'-dicarboxylic acid, succinic acid, glutaric acid, adipic acid, azelaic acid, sebacic acid, and the like. The polyester may be prepared from two or more of the above dicarboxylic acids.

It should be understood that use of the corresponding acid anhydrides, esters, and acid chlorides of these acids is included in the term "dicarboxylic acid".

The diol component of the sulfopolyester includes cycloaliphatic diols preferably having 6 to 20 carbon atoms or aliphatic diols preferably having 3 to 20 carbon atoms. Examples of such diols are: ethylene glycol, diethylene glycol, triethylene glycol, polyethylene glycol, 1,4-cyclohexanedimethanol, propane-1,3-diol, butane-1,4-diol, pentane-1,5-diol, hexane-1,6-diol, 3-methylpentanediol-(2,4), 2-methylpentanediol-(1,4), 2,2,4-trimethylpentane-diol-(1, 3), 2-ethylhexanediol-(1,3), 2,2-diethylpropane-diol-(1,3), hexanediol-(1,3), 1,4-di-(hydroxyethoxy)-benzene, 2,2-bis-(4-hydroxycyclohexyl)-propane, 2,4-dihydroxy-1,1,3,3-tetramethyl-cyclobutane, 2,2-bis-(3-hydroxyethoxyphenyl)-propane, and 2,2-bis-(4-hydroxypropoxyphenyl)-propane. The polyester may be prepared from two or more of the above diols.

The difunctional sulfomonomer component of the sulfopolyester may be a dicarboxylic acid or an ester thereof containing a sulfonate group ($-SO_3^-$), a diol containing a sulfonate group, or a hydroxy acid containing a sulfonate group. The cation of the sulfonate salt may be Na+, Li+, K+, $NH_4$+, and substituted ammonium. The term "substituted ammonium" refers to ammonium substituted with an alkyl or hydroxy alkyl radical having 1 to 4 carbon atoms. The sulfopolyesters of the invention are water-dispersible as a result of sulfonate groups on the sulfopolyester backbone.

The difunctional sulfomonomer contains at least one sulfonate group attached to an aromatic nucleus wherein the functional groups are hydroxy, carboxy or amino. Advantageous difunctional sulfomonomer components are those wherein the sulfonate salt group is attached to an aromatic acid nucleus such as benzene, naphthalene, diphenyl, oxydiphenyl, sulfonyldiphenyl or methylenediphenyl nucleus. Preferred results are obtained through the use of sulfophthalic acid, sulfoterephthalic acid, sulfoisophthalic acid, 4-sulfonaphthalene-2,7- dicarboxylic acid, and their esters. The sulfomonomer is present in an amount from 4 to 25 mole percent, preferably 10 to 24 mole percent, and most preferably 15 to 20 mole percent, based on 100 mole percent dicarboxylic acid and 100 mole percent diol.

In particularly preferred embodiments, the water dispersible sulfopolyester is derived from a mixture of dicarboxylic acids consisting of isophthalic acid (or ester) and 5-sodiosulfoisophthalic acid, a diol component consisting of diethylene glycol, or a mixture of diols consisting of at least 75 mole percent of diethylene glycol with the remaining diol being either ethylene glycol or 1,4-cyclohexane-dimethanol.

The inherent viscosity of the sulfopolyester should be in the range of 0.1 to 1.0 dl/g as measured in a 60/40 parts by weight solution of phenol/tetrachloroethane at 25° C. at a concentration of 0.25 grams of polymer in 100 mL of the solvent. Preferably, the inherent viscosity of the sulfopolyester is 0.20 to 0.40 dl/g, more preferably, 0.28 to 0.35 dl/g.

Enough of the sulfopolyester should be included in the correction fluid so that a consistent connective film will result, but not so much that the fluid becomes too thick to spread. The preferred correction fluid contains 5 to 25 weight percent sulfopolyester, more preferably 10 to 20 weight percent.

In addition to a sulfopolyester, the correction fluid may optionally contain 2 to 20, preferably, 5 to 5 weight percent based on the weight of the correction fluid of an acrylic emulsion. The presence of the acrylic emulsion increases the glossiness of the film formed from the correction fluid. The acrylic emulsion contains an acrylic polymer which has repeating units of the formula

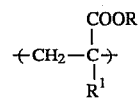

wherein R is hydrogen, or an alkyl group having 1 to 20 carbon atoms, and $R^1$ is hydrogen or a methyl group. The alkyl group may be a straight, branched, or cyclic alkyl group. Suitable alkyl groups include methyl, ethyl, propyl, isopropyl, n-butyl, sec-butyl, isobutyl, tertbutyl, hexyl, heptyl, 2-ethylhexyl, 2-ethylbutyl, dodecyl, hexadecyl, 2-ethoxyethyl and cyclohexyl. Optionally, the alkyl group may have up to two substituents selected from $C_1$–$C_6$ alkoxy and halogen. Preferably, R is a straight, branched, or cyclic alkyl group having 1 to 10 carbon atoms which is substituted with up to two substituents selected from $C_1$–$C_6$ alkoxy, chlorine and bromine.

The weight average molecular weight of the acrylic polymer in the acrylic emulsion is about 100,000 to about 500,000, preferably 200,000 to 400,000. The acrylic polymer has an acid number of 50 to 200, preferably 50 to 100. The acrylic emulsion has a glass transition temperature of −20° C. to 120° C., preferably, 10° C. to 50° C. The acrylic emulsion may optionally contain Styrene repeating units, acrylonitrile repeating units, or a combination thereof. Useful acrylic emulsions are commercially available under the tradename "JONCRYL", especially JONCRYL 77 and JONCRYL 74 which are styreneacrylic copolymers dispersed in water from S. C. Johnson and Sons, Inc., Racine, Wis.

Component (B) of the waterborne correction fluid is an opacifying pigment. Any suitable opacifying pigment having adequate hiding power to cover a desired type of marking, e.g., photocopied or typed, on a paper surface, may be utilized in the compositions of the invention. Titanium dioxide is preferred because it provides a basic white color which can be toned to meet a variety of requirements depending on the paper stock with which the correction fluid is to be applied. The grade of titanium dioxide such as rutile titanium dioxide and anatase titanium dioxide, is selected based upon the desired texture of the composition. Additional opacifying pigments include zinc sulfide, zinc oxide etc., which can be used alone or in combination with titanium dioxide. Preferably, the average particle size of the opacifying pigment is less than 0.5 microns. A preferred grade of titanium dioxide is available under the trademark Tronox® CR-800 from Kerr-McGee. It is preferred that the correction fluid contain at 20 to 60 weight percent of opacifying pigment, preferably 25 to 50 weight percent, more preferably 35 to 45 weight percent.

Component (C) of the waterborne correction fluid is water. Distilled or deionized water are the preferred sources of water since tap water generally contains ions which may precipitate the sulfopolyester, component (A). The amount of water in the correction fluid will depend upon the amount required to disperse the opacifying pigment. Generally, the water is present in an amount of 20 to 45 weight percent of the correction fluid. Preferably, water is present in an amount of 25 to 35 weight percent of the correction fluid.

The correction fluids of the present invention can include additives such as fillers, for example, talc and clay, fragrances, freeze-thaw stabilizers, dispersing agents, gums, chelating agents, colorants, dyes, pigments, defoamers, and the like normally used in correction fluids may be used if desired. Such additives, their amounts, and their use are well known in the art. For example, carbon black or lamp black may be incorporated as a coloring pigment to match the color of the correction fluid to white paper. Color pigments like yellow oxide and raw amber may be incorporated to match the color of the correction fluid to colored paper.

The viscosity of the correction fluid of the present invention is in the range of 400–2000 cps. However, depending on the specific application, a viscosity reducing agent may optionally be added to reduce the viscosity of the correction fluid. Suitable viscosity reducing agents include: propylene glycol, glycerol, n-propanol, isopropanol, and butanol. A preferred viscosity range for the correction fluid is 200 to 800 cps at a shear rate of 30 reciprocal seconds. Some of the viscosity reducing agents may also function as freeze-thaw stabilizers.

The preferred waterborne correction fluid of the present invention does not undergo a significant change in viscosity in response to temperature. Particularly preferred fluids are those in which the viscosity at 40° C. is within 10%, preferably 5%, of the viscosity at 25° C.

The correction fluids of the present invention exhibit relatively short drying times, typically less than 60 seconds, and preferably, 35 to 45 seconds. The correction fluids can be tested for drying time by applying the fluid on the marking to be corrected and at 5 second intervals determining the time when you can write over or type over the fluid without disturbing the surface of the corrected mark. The compositions also exhibit little or no settling over time. In addition, the compositions exhibit good flow properties, bonding and flexibility. The correction fluid of the present invention works especially well to correct laser-jet printed and photocopied markings. The correction fluid may also be used to correct handwritten markings.

A process for preparing the waterborne correction fluid of the present invention involves preparing the sulfopolyester, component (A), in pellet form. The sulfopolyester pellets are dispersed in water by adding pellets slowly to water at a temperature of 70° C. to 95° C. while applying continuous stirring to form a clear sulfopolyester dispersion. The sulfopolyester dispersion is cooled to room temperature.

At room temperature, about 25° C., the opacifying pigment, component (B), is added slowly to the sulfopolyester dispersion while stirring to form a slurry. After complete dispersion of the opacifying pigment(s), a viscosity reducing agent may be added to the slurry while continuous stirring. In addition other additives may be blended in at this time. The homogeneously mixed material is stored in the air tight container containing brush for correction fluid application.

The materials and testing procedures used for the results shown herein are as follows:

Preparation of 30% dispersions of water-dispersible sulfopolyester: A. Sulfopolyester A was prepared as follows: A 500 mL round bottom flask equipped with a ground-glass head, an agitator shaft, nitrogen inlet and a side arm was charged with 74.0 grams of isophthalic acid, 16.0 grams of 5-sodiosulfoisophthalic acid, 106.0 grams of diethylene glycol, sufficient titanium isopropoxide to provide 50 ppm of titanium, and 0.45 grams of sodium acetate tetrahydrate. The flask was immersed in a Belmont bath at 200° C. for two hours under a nitrogen sweep. The temperature of the bath was increased to 280° C. and the flask was heated for one hour under reduced pressure of 0.5 to 0.1 mm of Hg. The flask was allowed to cool to room temperature and the sulfopolyester was removed from the flask. The sulfopolyester had an I.V. of about 0.45 and a glass transition temperature of about 30° C. as measured using a differential scanning calorimeter (DSC). The sulfopolyester was extruded and pelletized.

A 30% solids dispersion of Sulfopolyester A in water was prepared by heating the water to a temperature of 75° C. to 85° C. and adding the required amount of pellets while agitating at a rate sufficient to maintain the pellets in suspension. The heating was continued until all the pellets were dispersed, approximately, 20 to 30 minutes. The dispersion was cooled between 40° C. to 50° C. and water was added to replace evaporation loss. The dispersion was filtered.

B. Sulfopolyester B was prepared by the procedure as set forth for Sulfopolyester A, using 74.0 grams of isophthalic acid, 16.0 grams of 5-sodiosulfoisophthalic acid, 83.0 grams of diethylene glycol, 16.0 grams of 1,4-cyclohexanedimethanol, sufficient titanium isopropoxide to provide 50 ppm of titanium, and 0.45 grams of sodium acetate tetrahydrate. Sulfopolyester B and an I.V. of about 0.36 and a glass transition temperature of about 38° C.

A 30% solids dispersion of Sulfopolyester B in water was prepared by heating the water to a temperature of 90° C. to 95° C. and adding the required amount of pellets while agitating at a rate sufficient to maintain the pellets in suspension. The heating was continued until all the pellets were dispersed, approximately, 20 to 30 minutes. The dispersion was cooled between 40° C. to 50° C. and water was added to replace evaporation loss. The dispersion was filtered.

C. Sulfopolyester C was prepared by the procedure as set forth for Sulfopolyester A, using 136.0 grams of isophthalic acid, 53.0 grams of 5-sodiosulfoisophthalic acid, 155.0 grams of diethylene glycol, 78.0 grams of 1,4-cyclohexanedimethanol, sufficient titanium isopropoxide to provide 50 ppm of titanium, and 1.48 grams of sodium acetate tetrahydrate. Sulfopolyester C had an I.V. of about 0.33 and a glass transition temperature of about 55° C.

A 30% solids dispersion of Sulfopolyester C in water was prepared by heating the water to a temperature of 85° C. to 90° C. and adding the required amount of pellets while agitating at a rate sufficient to maintain the pellets in suspension. The heating was continued until all the pellets were dispersed, approximately, 20 to 30 minutes. The dispersion was cooled between 40° C. to 50° C. and 10 weight percent of n-propanol was added. Water was added to replace evaporation loss. The dispersion was filtered.

Glass transition temperature (Tg) was determined using a differential scanning calorimeter (DSC).

Inherent viscosity (I.V.) was measured at 23° C. using 0.50 grams of polymer per 100 ml of a solvent consisting9 of 60% by weight phenol and 40% by weight tetrachloroethane. The acrylic polymer which was used in some examples was Joncryl 77® which is an acrylic emulsion available from Johnson Wax and is an acrylic polymer having a weight average molecular weight of >200,000, an acid number of 55, and a Tg of 21° C.

Titanium dioxide ($TiO_2$) is available under the trademark Tronox® CR-800 from Kerr-McGee.

The invention will be further illustrated by a consideration of the following examples, which are intended to be exemplary of the invention.

Sulfopolyesters used in the examples are as follows:

| Polyester Designation | IPA, Mol % | SIP, Mol % | DEG, Mol % | CHDM, Mol % | I.V. | Tg |
|---|---|---|---|---|---|---|
| A | 89 | 11 | 100 | 0 | .42 | 29 |
| B | 89 | 11 | 78 | 22 | .36 | 38 |
| C | 82 | 18 | 34 | 46 | .33 | 55 |

Where:
IPA = isophthalic acid
SIP = 5-sodiosulfoisophthalic acid
DEG = diethylene glycol
CHDM = 1,4-cyclohexanedimethanol
I.V. = inherent viscosity

EXAMPLE 1

Preparation of a 53.4% solids waterborne correction fluid.

| Ingredients | Amount (g) | (%) |
|---|---|---|
| Sulfopolyester C (30% solid) | 322.0 | 52.61 |
| Titanium dioxide | 206.0 | 33.66 |
| Talc | 20.0 | 3.27 |
| Clay | 4.0 | 0.65 |
| Propylene Glycol | 60.0 | 9.80 |

The dry powder form of $TiO_2$, clay and talc were mixed and then slowly added to the sulfopolyester dispersion while stirring with a Waring Commercial Blender. Talc and clay were used as fillers. Propylene glycol was added to the slurry while stirring. The waterborne correction fluid was stored in a container with applicator brush.

EXAMPLE 2

The waterborne correction fluid prepared in Example 1 was applied on laser-jet printed paper using an applicator brush. The film formed from the correction fluid was visually assessed and rated 1(poor), 2(fair), 3(good) or 4(excellent). Drying time of the film was 60 seconds.

| Properties of the Film | Visual Rating |
|---|---|
| Film Coverage | 4 (Excellent) |
| Film Drying | 2 (Fair) |
| Film Smoothness | 4 (Excellent) |
| Film Flexibility | 4 (Excellent) |
| Hiding | 3 (Good) |

The results clearly show that the film formed from the waterborne correction fluid of Example 1 exhibited acceptable properties. The viscosity of the correction fluid remained unchanged even after storing for three months.

EXAMPLE 3

The waterborne correction fluid prepared in Example 1 was compared with a correction fluid from the Gillette Company which contained a mixture of several solvents. The films formed from the correction fluids were rated 1(poor), 2(fair), 3(good) or 4(excellent).

| Properties of the Film | Visual Rating Waterborne System (Present Invention) | Solventborne System (Gillette Co.) |
|---|---|---|
| Film Coverage | 4 | 4 |
| Film Flexibility | 4 | 4 |
| Film Smoothness | 4 | 4 |
| Film Drying | 3 | 4 |
| Hiding | 3 | 3 |
| Smell | 4 | 1 |

The results clearly show that the waterborne correction fluid of the present invention has essentially the same performance properties as a correction fluid containing a mixture of several solvents. It is important to note, however, that the correction fluid containing a mixture of solvents, aside from having an adverse effect on the environment, dispenses an unpleasant smell to users.

EXAMPLE 4

Preparation of a 53.4% solids waterborne correction fluid.

| Ingredients | Amount (g) | (%) |
|---|---|---|
| Sulfopolyester C (30% solid) | 322.0 | 52.61 |
| Titanium dioxide | 226.0 | 36.93 |
| Clay | 4.0 | 0.65 |
| Propylene Glycol | 60.0 | 9.80 |

The dry powder form of $TiO_2$, and clay were mixed and then slowly added to the sulfopolyester dispersion while stirring with a Waring Commercial Blender. Talc and clay were used as fillers. Propylene glycol was added to the slurry while stirring. The waterborne correction fluid was stored in a container with an applicator brush.

EXAMPLE 5

Example 1 was repeated with the exception that carbon black was added to the waterborne correction fluid formulation to match the color of the film with that of paper. The addition of carbon black did not adversely effect the performance properties of the waterborne correction fluid film.

EXAMPLE 6

Preparation of a 68.5% solids waterborne correction fluid containing 20% of an acrylic emulsion.

| Ingredients | Amount (g) | (%) |
|---|---|---|
| Titanium dioxide | 220.0 | 54.98 |

-continued

| Ingredients | Amount (g) | (%) |
|---|---|---|
| Sulfopolyester C (30% solid) | 120.0 | 29.98 |
| Joncryl ®-77 Emulsion (45% solid) | 40.0 | 10.00 |
| Propylene Glycol | 20.0 | 5.00 |
| Carbon Black (Powder) | 0.16 | 0.04 |

Joncryl®-77 acrylic emulsion was slowly added to the Sulfopolyester C dispersion while stirring with a Waring Commercial Blender. Stirring was continued and TiO₂ was added to form a pigment slurry. Propylene glycol was added to the slurry while stirring to reduce the viscosity of the slurry. Carbon black was added to the slurry while stirring to match the color of the waterborne correction fluid with the paper to which it was applied. The waterborne correction fluid was stored in a container with an applicator brush.

The waterborne correction fluid formed a dry film on pad paper and coated paper in 45–50 seconds. The film was smooth and flexible with excellent hiding on laser-jet printed paper and photocopied paper.

EXAMPLE 7

Preparation of a 72.1% solids waterborne correction fluid.

| Ingredients | Amount (g) | (%) |
|---|---|---|
| Titanium dioxide | 240.0 | 59.98 |
| Sulfopolyester C (30% solid) | 116.0 | 28.98 |
| Joncryl-77 Emulsion (45% solid) | 28.0 | 7.00 |
| Propylene Glycol | 16.0 | 4.00 |
| Carbon Black (Powder) | 0.17 | 0.04 |

The waterborne correction fluid was prepared by the process as set forth in Example 6. The waterborne correction fluid formed a dry film on pad paper and coated paper in 45–50 seconds. The film was smooth and flexible with excellent hiding on laser-jet printed paper and photocopied paper.

EXAMPLE 8

Preparation of a scaled-up quantity of 68.5% solids waterborne correction fluid.

| Ingredients | Amount (g) | (%) |
|---|---|---|
| Titanium dioxide | 440.0 | 54.98 |
| Sulfopolyester C (30% solid) | 240.0 | 29.99 |
| Joncryl-77 Emulsion (45% solid) | 80.0 | 10.00 |
| Propylene Glycol | 40.0 | 5.00 |
| Carbon Black (Powder) | 0.32 | 0.04 |

The waterborne correction fluid was prepared by the process as set forth in Example 6. The waterborne correction fluid formed a dry film on pad paper and coated paper in 45–50 seconds. The film was smooth and flexible with excellent hiding on laser-jet printed paper and photocopied paper.

EXAMPLE 9

Preparation of a 68.5% solids waterborne correction fluid containing no volatile organic compounds.

| Ingredients | Amount (g) | (%) |
|---|---|---|
| Titanium dioxide | 440.0 | 54.98 |
| Sulfopolyester B (30% solid) | 240.0 | 29.99 |
| Joncryl-77 Emulsion (45% solid) | 80.0 | 10.00 |
| Propylene Glycol | 40.0 | 5.00 |
| Carbon Black (Powder) | 0.32 | 0.04 |

The waterborne correction fluid was prepared by the process as set forth in Example 6. The waterborne correction fluid formed a dry film on pad paper and coated paper in 45–50 seconds. The film was smooth and flexible with excellent hiding on laser-jet printed paper and photocopied paper.

EXAMPLE 10

The correction fluid compositions described in Examples 1 and 4–9 were applied on laser-jet printed markings and photocopied markings. The correction fluid of the present invention dried quickly to form a film which was strongly bonded to the paper surface which effectively covered erroneous markings on the surface. The film did not interact with the markings to cause bleeding.

Many variations will suggest themselves to those skilled in this art in light of the above detailed description. All such obvious modifications are within the full intended scope of the appended claims.

What is claimed is:

1. A high solids content waterborne correction fluid for correcting laser-jet printed and photocopied markings consisting essentially of:
    (A) 5 to 25 weight percent of a sulfopolyester having a weight average molecular weight of 7,000 to 15,000, an inherent viscosity of 0.2 to 0.4 dl/g, and a glass transition temperature of 35° C. to 60° C., comprising repeat units from
        (1) a dicarboxylic acid selected from the group consisting of aromatic dicarboxylic acids, saturated aliphatic dicarboxylic acids, cycloaliphatic dicarboxylic acids, and combinations thereof;
        (2) a diol; and
        (3) a difunctional sulfomonomer containing at least one sulfonate group attached to an aromatic nucleus wherein the functional groups are hydroxy, carboxy or amino, provided the difunctional sulfomonomer is present in an amount from 10 to 24 mole percent based on 100 mole percent dicarboxylic acid and 100 mole percent diol;
    (B) 25 to 55 weight percent of titanium dioxide; and
    (C) 20 to 45 weight percent of water,
wherein the correction fluid has a solids content of 50 to 80 percent.

2. A high solids content waterborne correction fluid for correcting laser-jet printed and photocopied markings consisting essentially of:
    (A) 10 to 25 weight percent of a sulfopolyester having a weight average molecular weight of 10,000 to 13,000, an inherent viscosity of 0.28 to 0.35 dl/g, and a glass transition temperature of 45° C. to 55° C., comprising repeat units from
(1) a dicarboxylic acid selected from the group consisting of aromatic dicarboxylic acids, saturated aliphatic dicarboxylic acids, cycloaliphatic dicarboxylic acids, and combinations thereof;
(2) a diol; and
(3) a difunctional sulfomonomer containing at least one sulfonate group attached to an aromatic nucleus wherein the functional groups are hydroxy, carboxy or amino, provided the difunctional sulfomonomer is present in an amount from 15 to 20 mole percent based on 100 mole percent dicarboxylic acid and 100 mole percent diol;

(B) 35 to 45 weight percent of titanium dioxide; and (C) 20 to 35 weight percent of deionized water, wherein the correction fluid has a solids content of 60 to 75 percent.

* * * * *